United States Patent
Bagian et al.

(10) Patent No.: US 10,632,873 B2
(45) Date of Patent: Apr. 28, 2020

(54) SEAT STRUCTURE DUAL MOTION RECLINER PIVOT MECHANISM

(71) Applicant: FORD GLOBAL TECHNOLOGIES, LLC, Dearborn, MI (US)

(72) Inventors: Kimberly Bagian, Northville, MI (US); Jeffrey M. Attala, Lasalle (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 63 days.

(21) Appl. No.: 15/944,882

(22) Filed: Apr. 4, 2018

(65) Prior Publication Data

US 2019/0308532 A1     Oct. 10, 2019

(51) Int. Cl.
*B60N 2/30* (2006.01)
*B60N 2/36* (2006.01)

(52) U.S. Cl.
CPC ............. *B60N 2/3031* (2013.01); *B60N 2/36* (2013.01)

(58) Field of Classification Search
CPC ......... B60N 2/3031; B60N 2/36; B60N 2/206
USPC ...................................................... 297/378.1
See application file for complete search history.

(56) References Cited

U.S. PATENT DOCUMENTS

| | | | |
|---|---|---|---|
| 681,784 A | 9/1901 | Hale | |
| 2,576,343 A | 11/1951 | Hibbard et al. | |
| 2,927,818 A * | 3/1960 | Ferrara | B60N 2/36 296/66 |
| 3,441,313 A * | 4/1969 | Bror | B60N 2/22 297/374 |
| 4,045,082 A | 8/1977 | Egert et al. | |
| 4,394,047 A * | 7/1983 | Brunelle | B60N 2/20 16/339 |
| 4,620,335 A * | 11/1986 | Dodgen | B60N 2/34 296/69 |
| 4,626,028 A | 12/1986 | Hatsutta et al. | |
| 4,709,961 A | 12/1987 | Hill | |
| 4,832,400 A | 5/1989 | Aoki et al. | |
| 4,969,682 A * | 11/1990 | Gray | B60N 2/20 297/378.1 |
| 4,977,973 A | 12/1990 | Takizawa | |
| 5,003,240 A | 3/1991 | Ikeda | |
| 5,011,225 A | 4/1991 | Nemoto | |
| 5,011,226 A | 4/1991 | Ikeda et al. | |
| 5,015,026 A | 5/1991 | Mouri | |
| 5,058,953 A | 10/1991 | Takagi et al. | |
| 5,145,233 A | 9/1992 | Nagashima | |
| 5,364,164 A | 11/1994 | Kuranami | |
| 5,460,426 A * | 10/1995 | Tribelsky | A47C 4/52 297/17 |
| 5,567,011 A | 10/1996 | Sessini | |
| 5,836,648 A | 11/1998 | Karschin | |
| 6,070,934 A * | 6/2000 | Schaefer | B60N 2/206 296/65.09 |

(Continued)

*Primary Examiner* — Milton Nelson, Jr.
(74) *Attorney, Agent, or Firm* — David Coppiellie; Price Heneveld LLP (57) ABSTRACT

A seating assembly comprises an arcuate bracket mounted to a seatback assembly and having a first pivot point proximate a first end of the arcuate bracket, a forward mount operably coupled within a curved slot formed in the arcuate bracket, a rearward mount, and a control link operably coupled with each of the first pivot point and the rearward mount. The seatback assembly pivots forwardly and translates rearwardly when rotated to a forward folded stowed position.

20 Claims, 11 Drawing Sheets

(56) References Cited

U.S. PATENT DOCUMENTS

| | | | |
|---|---|---|---|
| 6,113,191 A * | 9/2000 | Seibold | B60N 2/3013 297/322 |
| 6,135,561 A | 10/2000 | Kruger et al. | |
| 6,183,033 B1 | 2/2001 | Arai et al. | |
| 6,213,549 B1 | 4/2001 | Wieclawski | |
| 6,270,141 B2 * | 8/2001 | Moon | B60N 2/206 296/65.08 |
| 6,273,511 B1 | 8/2001 | Wieclawski | |
| 6,439,636 B1 | 8/2002 | Kuo | |
| 6,478,373 B1 | 11/2002 | Hake et al. | |
| 6,565,150 B2 | 5/2003 | Fischer et al. | |
| 6,719,368 B1 | 4/2004 | Neale | |
| 7,077,472 B2 | 7/2006 | Steffens, Jr. | |
| 7,322,646 B2 | 1/2008 | Jammalamadaka et al. | |
| 7,364,231 B2 | 4/2008 | Park et al. | |
| 7,393,052 B2 | 7/2008 | Humer et al. | |
| 7,523,888 B2 | 4/2009 | Ferry et al. | |
| 7,644,982 B2 | 1/2010 | Paluch | |
| 7,735,914 B2 * | 6/2010 | Longnecker | A47C 13/00 297/125 |
| 7,645,729 B2 | 12/2010 | Yamada et al. | |
| 7,891,696 B2 | 2/2011 | Hanson | |
| 7,934,762 B2 | 5/2011 | Hollenbeck et al. | |
| 8,033,610 B2 | 10/2011 | Graber et al. | |
| 8,052,194 B2 | 11/2011 | Sayama | |
| 8,104,836 B2 | 1/2012 | Little | |
| 8,141,930 B2 | 3/2012 | Sayama | |
| 8,177,279 B2 * | 5/2012 | Wada | B60N 2/3013 296/65.01 |
| 8,177,281 B2 | 5/2012 | Sayama | |
| 8,201,890 B1 | 6/2012 | Mihara | |
| 8,262,164 B2 | 9/2012 | Ito | |
| 8,287,024 B2 | 10/2012 | Sayama | |
| 8,287,037 B2 | 10/2012 | Sayama | |
| 8,336,955 B2 | 12/2012 | Sayama | |
| 8,388,054 B2 | 3/2013 | Sayama | |
| 8,449,029 B2 | 5/2013 | Runde | |
| 8,528,978 B2 | 9/2013 | Purpura et al. | |
| 8,534,750 B2 | 9/2013 | Sayama | |
| 8,540,308 B2 | 9/2013 | Aoki et al. | |
| 8,899,683 B2 | 12/2014 | Ito | |
| 8,998,327 B2 | 4/2015 | Cooney | |
| 2004/0012234 A1 | 1/2004 | Yamaguchi et al. | |
| 2004/0070240 A1 | 4/2004 | Haland et al. | |
| 2005/0017561 A1 | 1/2005 | Burmeister, III et al. | |
| 2005/0225145 A1 | 10/2005 | Furtado et al. | |
| 2005/0280296 A1 | 12/2005 | Ohchi et al. | |
| 2006/0006709 A1 | 1/2006 | Uno et al. | |
| 2006/0071517 A1 | 4/2006 | Humer et al. | |
| 2006/0202524 A1 | 9/2006 | Yamaguchi | |
| 2006/0202525 A1 | 9/2006 | Yamaguchi et al. | |
| 2006/0255611 A1 * | 11/2006 | Smith | B60N 2/36 296/37.16 |
| 2008/0012402 A1 | 1/2008 | Sekida | |
| 2008/0073950 A1 | 3/2008 | Ko | |
| 2008/0084098 A1 | 4/2008 | Humer et al. | |
| 2008/0088158 A1 | 4/2008 | Yokota et al. | |
| 2008/0129093 A1 | 6/2008 | Kim | |
| 2009/0167066 A1 | 7/2009 | Mori et al. | |
| 2009/0309398 A1 | 12/2009 | Niitsuma et al. | |
| 2010/0026060 A1 | 2/2010 | Niitsuma et al. | |
| 2010/0066135 A1 | 3/2010 | Humer et al. | |
| 2010/0066136 A1 | 3/2010 | D'Agostini | |
| 2010/0090505 A1 | 4/2010 | Tarusawa et al. | |
| 2010/0127540 A1 | 5/2010 | Park et al. | |
| 2010/0148545 A1 | 6/2010 | Omori | |
| 2010/0187875 A1 | 7/2010 | Sasaki et al. | |
| 2010/0201167 A1 | 8/2010 | Wieclawski | |
| 2010/0264704 A1 | 10/2010 | Yasuda et al. | |
| 2010/0270834 A1 | 10/2010 | Niitsuma | |
| 2010/0270835 A1 | 10/2010 | Nitsuma | |
| 2010/0295348 A1 | 11/2010 | Takayasu et al. | |
| 2010/0308629 A1 | 12/2010 | Lee et al. | |
| 2011/0187167 A1 | 8/2011 | Takayasu et al. | |
| 2011/0272978 A1 | 11/2011 | Nitsuma | |
| 2012/0068517 A1 | 3/2012 | Yetukuri et al. | |
| 2012/0212016 A1 | 8/2012 | Kanda | |
| 2013/0207411 A1 * | 8/2013 | Holzhueter | B60N 2/36 296/65.09 |
| 2014/0203615 A1 | 7/2014 | Little | |
| 2014/0368015 A1 | 12/2014 | Basters et al. | |

* cited by examiner

SEAT STRUCTURE DUAL MOTION RECLINER PIVOT MECHANISM

FIELD OF THE INVENTION

The present invention generally relates to a device in a motor vehicle to improve the interface and transition of an extended cargo area row to row and row to cargo area, as well as the utility and appearance of storage compartments in motor vehicles and, more particularly, a seat structure that provides dual motion to a seatback assembly as the seatback assembly is pivoted forward to eliminate any gap between a rear edge of the folded seatback assembly and a car-forward edge of a rear cargo area floor.

BACKGROUND OF THE INVENTION

Motor vehicle seating assemblies, particularly those used in the second and third row seating positions, or any seating row proximate a rear storage area, and disposed forward of a rear cargo area floor, often employ a seatback assembly that pivots forward about a fixed pivot from an upright design position to a forward folded stowed position, such that a rearward exposed surface of the seatback assembly and the rear cargo area floor form an extended cargo area. However, such seating assemblies often create a gap between the rear edge of the folded seatback assembly and the car-forward edge of the rear cargo area floor when in the forward folded stowed position, which precludes a continuous and uninterrupted surface for the extended cargo area. These gaps can exist between multiple rows of seats or between seats and rear cargo areas. Prior attempts to bridge such gaps with separate and additional folding trim pieces added additional cost and labor during assembly, as well as additional weight to the motor vehicle.

In addition, foldable seatbacks that rotate forward about a single pivot also require adequate clearance in the car-forward direction to prevent interference with the seating assembly located forward of the forward folding seatback assembly during the forward-folding procedure, which often requires the need for a folding head restraint assembly on the forward folding seatback assembly, further adding cost and weight.

A foldable seatback assembly that eliminates such gaps when folded and reduces the clearance required with the seating assembly located forward of the forward folding seatback assembly during the forward-folding procedure is desired.

SUMMARY OF THE INVENTION

According to one aspect of the present disclosure, a seating assembly comprises an arcuate bracket mounted to a seatback assembly and a first pivot point disposed proximate a first end of the arcuate bracket, a forward mount operably coupled within a curved slot formed in the arcuate bracket, a rearward mount, and a control link operably coupled with each of the first pivot point and the rearward mount. The seatback assembly pivots forwardly and translates rearwardly when rotated to a forward folded stowed position.

Embodiments of the first aspect of the disclosure can include any one or a combination of the following features:
 the forward mount further comprises a support structure pin that is slidably disposed and received within the curved slot and through which the forward mount is operably coupled with the curved slot;
 the seatback assembly is foldable between an upright design position and the forward folded stowed position, and a first end of the arcuate bracket is mounted to an upper portion of the seatback assembly at the first pivot point and a second end of the arcuate bracket is mounted to a lower portion of the seatback assembly at the second support point;
 a rear edge of the seatback assembly moves rearwardly when the seatback assembly is rotated from the upright design position to the forward folded stowed position;
 the rear edge of the seatback assembly is disposed in juxtaposed relation with a forward edge of a rear cargo area floor when the seatback assembly is in the forward folded stowed position;
 an exposed rearward surface of the seatback assembly and the rear cargo area floor form a substantially continuous surface when the seatback assembly is in the forward folded stowed position;
 the arcuate bracket is fixedly mounted and disposed within a recess disposed on a side of the seatback assembly;
 the forward mount and the rearward mount are separate components separately mounted to a floor pan of a motor vehicle;
 the forward mount and the rearward mount are combined as an integrated bracket mounted to a floor pan of a motor vehicle;
 a pair of arcuate brackets may be mounted at opposite ends to a seatback assembly at the first pivot point and the second support point, respectively, a pair of forward mounts operably coupled within a curved slot formed in each of the arcuate brackets, a pair of rearward mounts, and a pair of control links operably coupled with each of the first pivot points and the rearward mounts, wherein one each of the pair of arcuate brackets, forward mounts, rearward mounts, and control links is disposed on each lateral side of the seating assembly;
 a forward edge and a rear edge of the seatback assembly moves rearwardly when the seatback assembly is rotated from the upright design position to the forward folded stowed position;
 the seating assembly comprises a second row or further rearward seating assembly and a rear cargo area floor is disposed rearward of the seating assembly;
 the rear edge of the seatback assembly is disposed in juxtaposed relation with a forward edge of the rear cargo area floor when the seatback assembly is in the forward folded stowed position and an exposed rearward surface of the seatback assembly, and the rear cargo area floor form a substantially continuous surface when the seatback assembly is in the forward folded stowed position;
 the forward mount comprises a support structure pin slidably received and disposed within the curved slot, whereby the support structure pin operably couples the forward mount with the curved slot of the arcuate bracket;
 the control link is operably coupled with each of the first pivot point and the rearward mount via a pivot pin, respectively;
 an integrated bracket is mounted to a floor pan of a motor vehicle, and wherein each of the support structure pin and the control link is mounted on the integrated bracket;

a pair of dual motion recliner pivot mechanisms, one each of the pair of dual motion recliner pivot mechanisms being disposed on each lateral side of the seating assembly; and the seating assembly is arranged as one of a pair of seating assemblies disposed in side-by-side relation within a motor vehicle, the pair of seating assemblies comprising a second row or further rearward seating assembly with a rear cargo area floor disposed rearward of the pair of seating assemblies, and a rear edge of the seatback assembly of each of the pair of seating assemblies is disposed in juxtaposed relation with a forward edge of the rear cargo area floor when either of the seatback assemblies is in the forward folded stowed position and an exposed rearward surface of the seatback assembly and the rear cargo area floor form a substantially continuous surface when each of the seatback assemblies of the pair of seating assemblies is in the forward folded stowed position.

According to another aspect of the present disclosure, a seating assembly comprises a dual motion recliner pivot mechanism for a seating assembly having a forward foldable seatback assembly having an upright design position and a forward folded stowed position mounted to a floor pan of a motor vehicle. The dual motion recliner pivot mechanism comprises an arcuate bracket having a curved slot disposed substantially along a centerline of the arcuate bracket, where a first end of the arcuate bracket is disposed proximate to an upper portion of the forward foldable seatback assembly at a first pivot point and a second end of the arcuate bracket is disposed proximate to a lower portion of the forward foldable seatback assembly, a forward mount operably coupled with the curved slot of the arcuate bracket, a rearward mount, and a control link operably coupled at a first end thereof with the first pivot point and operatively coupled at a second end thereof with the rearward mount. The forward foldable seatback assembly simultaneously pivots forwardly and translates rearwardly when rotated from the design position to the forward folded stowed position.

According to a further aspect of the present disclosure, a seating assembly comprises a seatback assembly, a lower seat assembly, and a dual motion recliner pivot mechanism. The dual motion recliner pivot mechanism comprising an arcuate bracket having a first end mounted proximate to an upper portion of the seatback assembly proximate a first pivot point and a second end mounted proximate to a lower portion of the seatback assembly, a forward mount operably coupled within a curved slot formed in the arcuate bracket, a rearward mount, and a control link operably coupled with each of the first pivot point and the rearward mount. The seatback assembly pivots forwardly and is translated rearwardly when rotated to a forward folded stowed position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
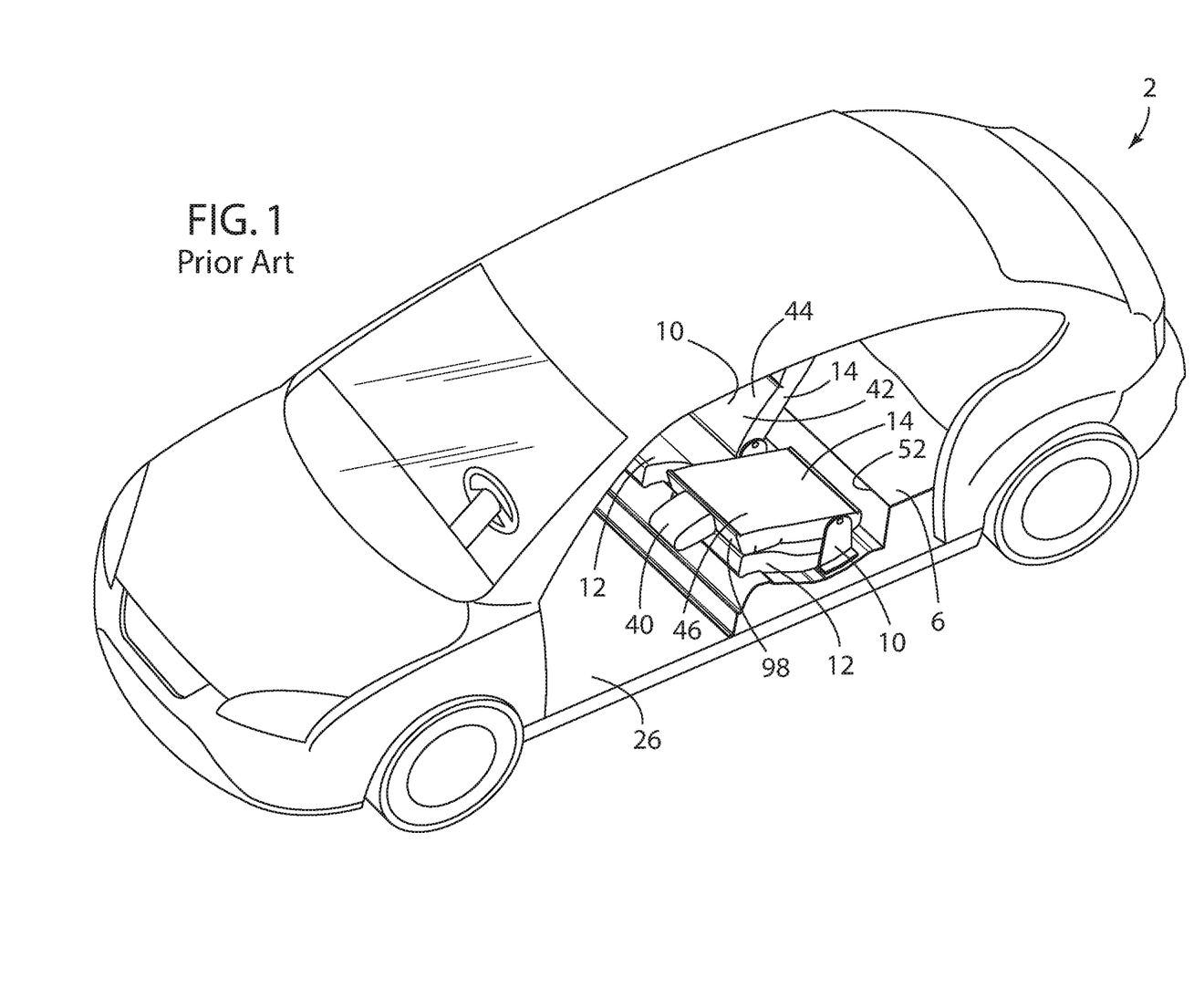
FIG. 1 is a front side perspective view of a pair of side-by-side second row motor vehicle seating assemblies in accordance with the prior art, wherein one of the seatback assemblies of one of the motor vehicle seating assemblies is in the upright design position and the other one of the seatback assemblies of the other one of the motor vehicle seating assemblies is in the forward folded stowed position.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, reference numeral 2 generally designates a motor vehicle equipped with a pair of motor vehicle seating assemblies 10 arranged side-by-side, typically installed in a rear seating area, as shown. As is known, a pair of front row motor vehicle seating assemblies (not shown) may be mounted forward of the rearward seating assemblies. The motor vehicle seating assembly 10 in accordance the present disclosure is particularly suited for application to second row or further rearward seating row positions, as further described below. However, it is contemplated that the present disclosure may be likewise be adapted for use in conjunction with front row motor vehicle seating assemblies 10 used in motor vehicles having only one row of motor vehicle seating assemblies 10 installed forward of a rear cargo area floor 6, as is the case in coupe-style and convertible-style motor vehicles.

Figure 2A:
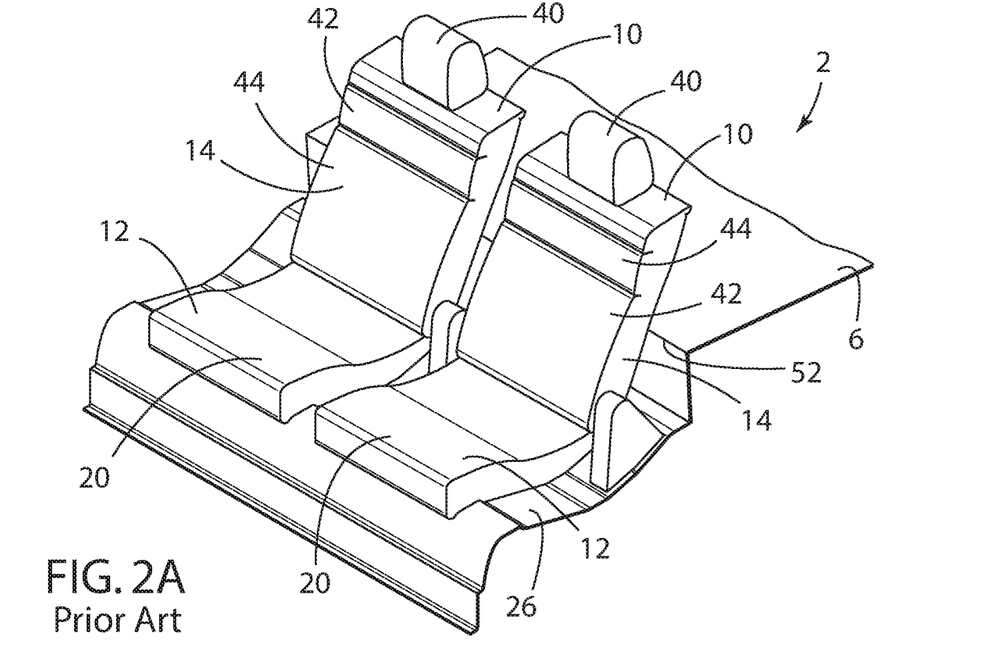
FIG. 2A is a front side perspective view of the motor vehicle seating assemblies of FIG. 1, wherein each of the seatback assemblies of the motor vehicle seating assemblies is in the upright design position.
Figure 2B:
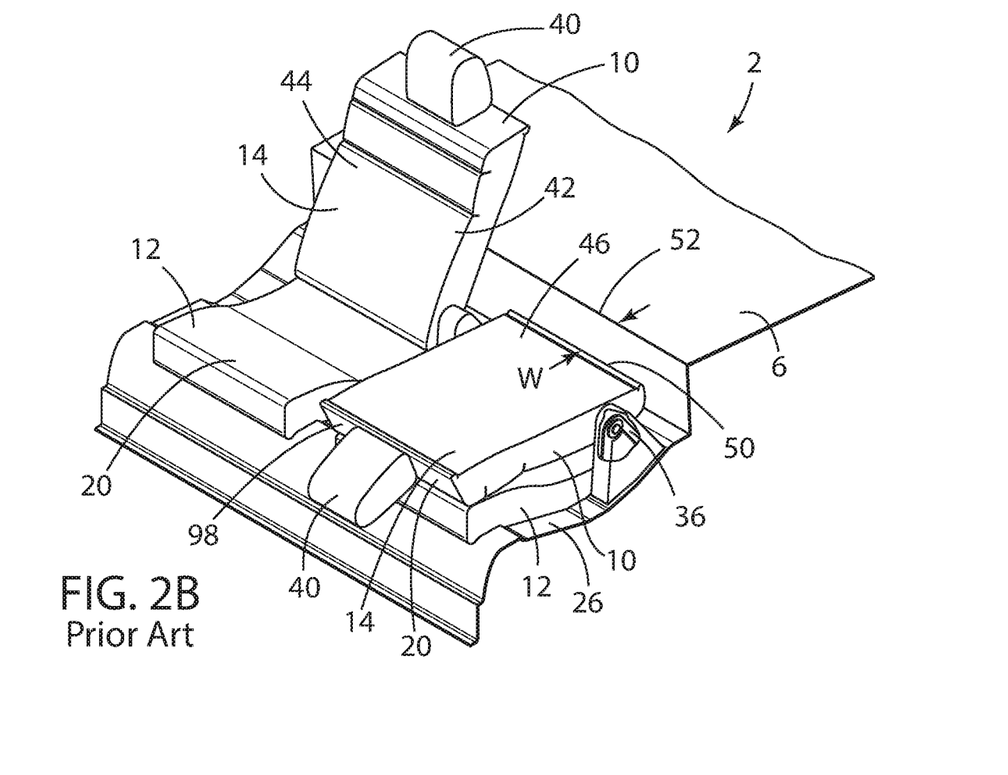
FIG. 2B is a front side perspective view of the motor vehicle seating assemblies of FIG. 1, wherein one of the seatback assemblies of one of the motor vehicle seating assemblies is in the design position and the other one of the seatback assemblies of the other one of the motor vehicle seating assemblies is in the forward folded stowed position.
Figure 3:
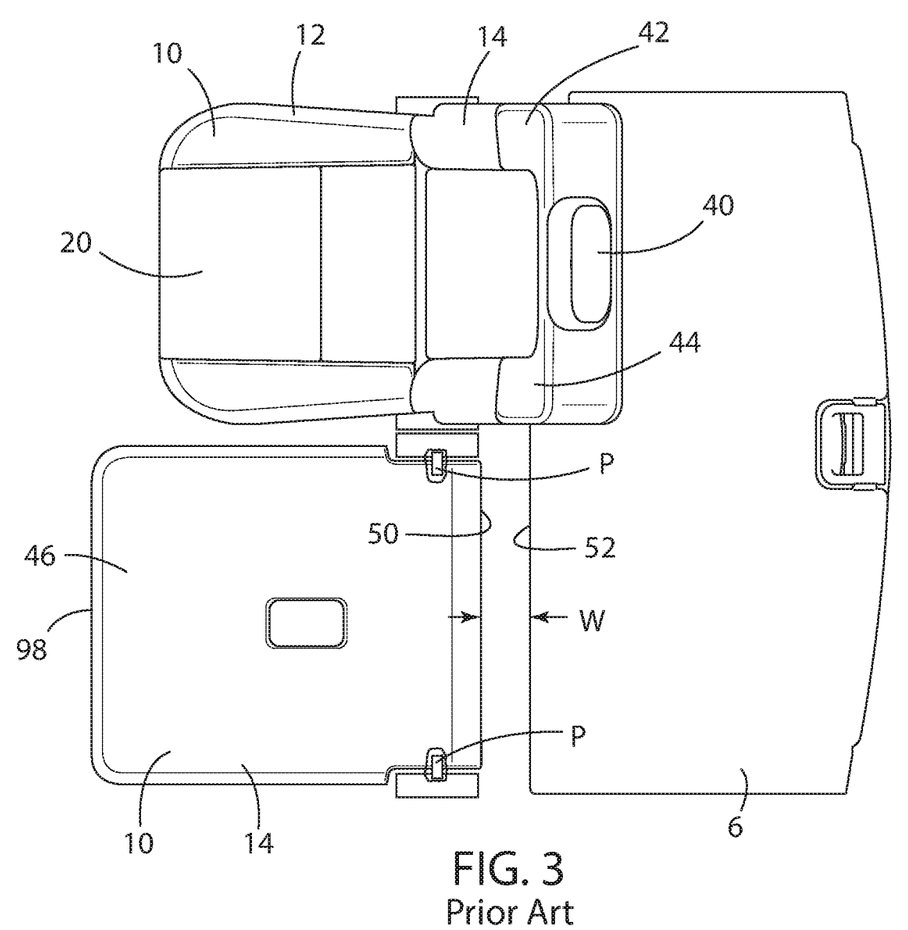
FIG. 3 is a top plan view of the motor vehicle seating assemblies of FIG. 1, wherein one of the seatback assemblies of one of the motor vehicle seating assemblies is in the upright design position and the other one of the seatback assemblies of the other one of the motor vehicle seating assemblies is in the forward folded stowed position.

The motor vehicle seating assembly 10 are generally disposed in pairs arranged in side-by-side relation and generally comprises a lower seating assembly 12 and a seatback assembly 14 normally projecting upwardly therefrom. As shown in FIGS. 2A, 2B, and 3, each one of the pair of motor vehicle seating assemblies 10, including the lower seating assembly 12 and the seatback assembly 14, may each comprise approximately 50% of the width of the motor vehicle 2. Alternatively, although not shown, it is known that the motor vehicle seating assemblies 10 may be asymmetrical, with a first of the pair of motor vehicle seating assemblies 10 representing approximately 40% of the width of the motor vehicle 2 and a second of the pair of motor vehicle seating assembles representing approximately 60% of the width of the motor vehicle 2.

Figure 5A:
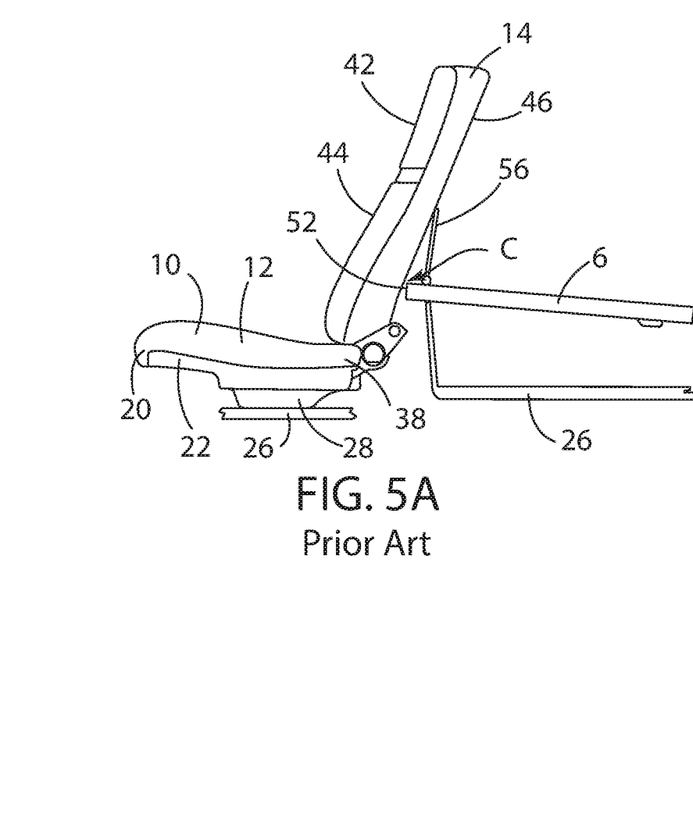
FIG. 5A is a side view of one of the motor vehicle seating assemblies of FIG. 1, wherein the seatback assembly is in the upright design position.
Figure 5B:
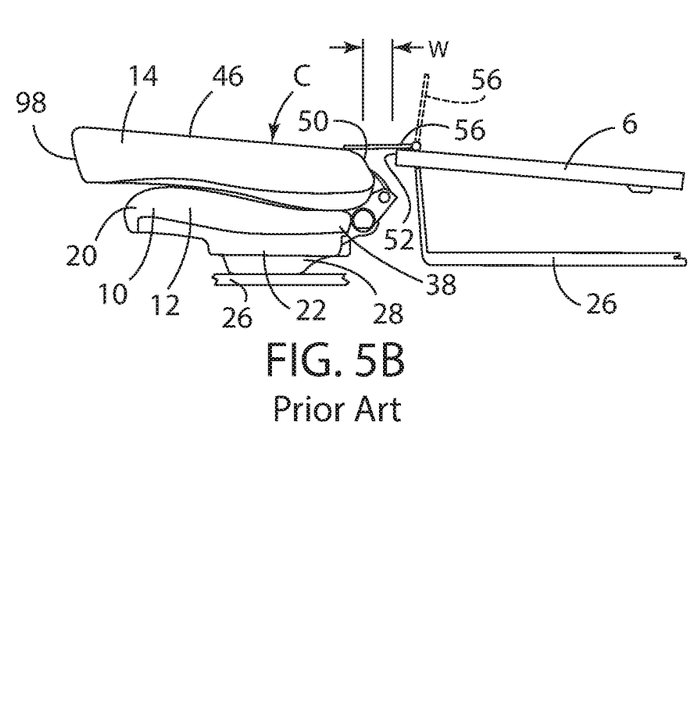
FIG. 5B is a side view of one of the motor vehicle seating assemblies of FIG. 1, wherein the seatback assembly is in the forward folded stowed position.
Figure 6A:
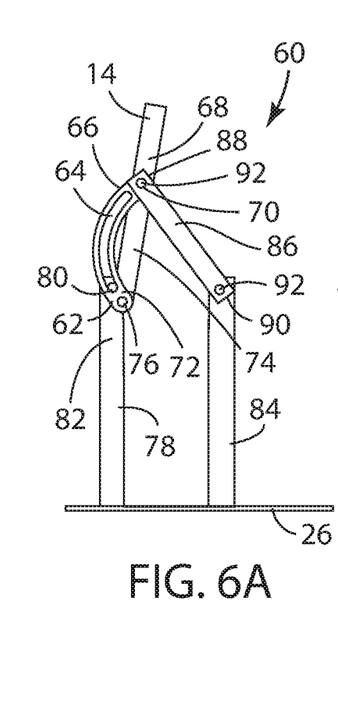
FIG. 6A is a schematic side view of a first embodiment of the dual motion recliner pivot mechanism of the present disclosure, wherein the seatback assembly is in the upright design position.
Figure 6B:
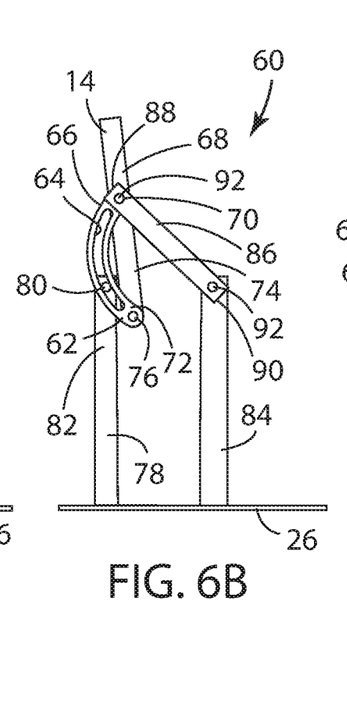
FIG. 6B is a schematic side view of the dual motion recliner pivot mechanism of FIG. 6A of the present disclosure, wherein the seatback assembly is being rotated from the upright design position to the forward folded stowed position.
Figure 6C:
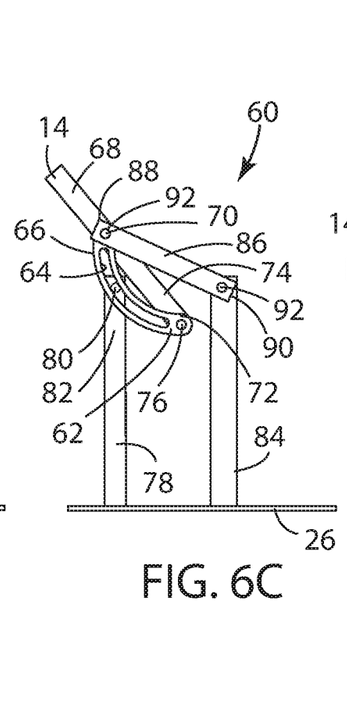
FIG. 6C is a schematic side view of the dual motion recliner pivot mechanism of FIG. 6A of the present disclosure, wherein the seatback assembly is being further rotated from the upright design position to the forward folded stowed position.
Figure 6D:
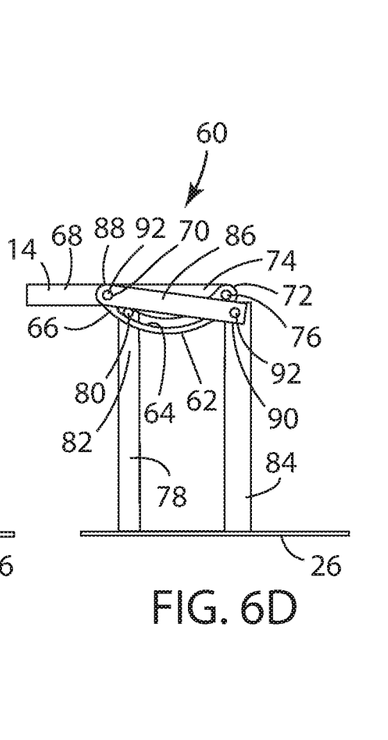
FIG. 6D is a schematic side view of the dual motion recliner pivot mechanism of FIG. 6A of the present disclosure, wherein the seatback assembly is fully rotated to the forward folded stowed position.

As shown in FIGS. 5A-5B, the lower seating assembly 12 may have an exposed upper foam cushion and trim cover assembly 20 supported by a cushion pan 22 upon which a motor vehicle occupant can be supported. The lower seating assembly 12 is preferably fixedly mounted to a floor pan 26 disposed below the lower seating assembly 12 via a mounting bracket 28.

Figure 4:
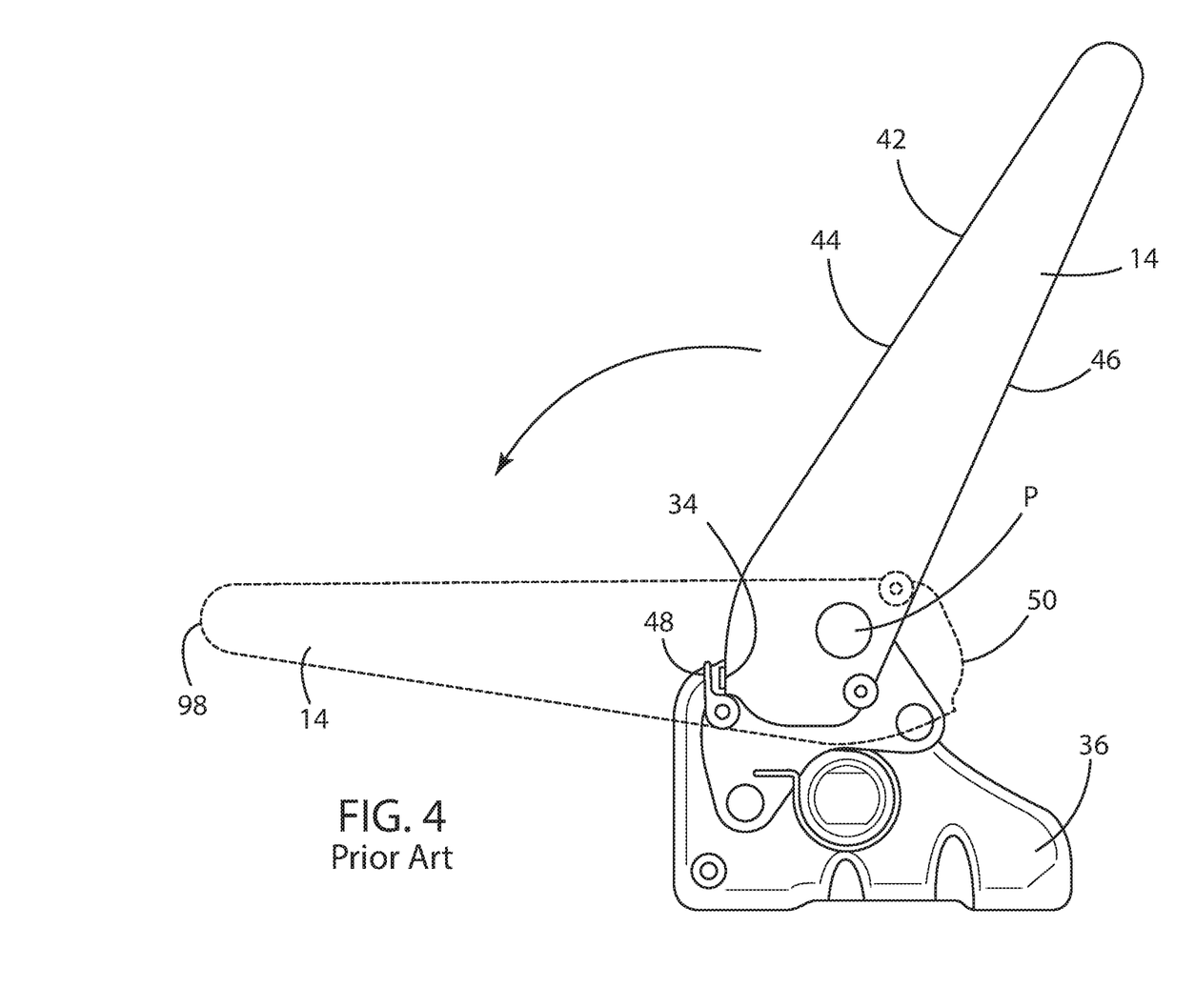
FIG. 4 is a side view of one of the motor vehicle seating assemblies of FIG. 1, wherein the seatback assembly is in the upright design position in solid lines and the seatback assembly is in the forward folded stowed position in dashed lines.

The seatback assembly 14 may be pivotably mounted to a bracket 36 affixed to the floor pan 26 proximate a rear edge 50 of the seatback assembly 14, as shown in FIGS. 2 and 4. The seatback assembly 14 preferably includes one or more head restraint assemblies 40 and an exposed forward surface 42 that likewise generally consists of a foam cushion and trim cover assembly 44 that supports the back of a motor vehicle occupant. The seatback assembly 14 also includes an exposed rearward surface 46. As further shown in FIG. 4, the motor vehicle seating assembly 10 may include a seatback assembly latch 48 that engages the forward edge 34 of the seatback assembly 14 when the seatback assembly 14 is in the upright design position. As shown in FIGS. 4 and 5A-5B, when it is desired to move the seatback assembly 14 to the forward folded stowed position, the seatback assembly latch 48 is released, whereupon the seatback assembly 14 may be rotated or "flipped" forward to bring the exposed rearward surface 46 into a horizontal orientation facing upward. Particularly in the case where a carpeted rear cargo area floor 6 is situated behind the motor vehicle seating assembly 10, the exposed rearward surface 46 of the seatback assembly 14 may be, for example, covered by a matching carpet to provide a substantially continuous and enlarged rear cargo area.

As perhaps illustrated in FIG. 3, the motor vehicle seating assemblies 10 located in rearward seating rows having seatback assemblies 14 that fold forward and rotate about a single pivot P often create a substantial gap W between a rearward edge 50 of the seatback assembly 14 in the forward folded stowed position and a forward edge 52 of a rear cargo area floor 6 when the seatback assembly is in the forward folded stowed position. As further shown in FIGS. 3 and 5B, these gaps W can exist between multiple rows of seats, as well as between the seatback assembly 14 and the rear cargo area floors. Often, additional trim pieces 56, sometimes referred to as "gap hiders," are used to bridge such gaps W that may exist between a rearward edge 50 of the seatback assembly 14 in the forward folded stowed position and a forward edge 52 of a rear cargo area floor 6 when the seatback assembly 14 is in the forward folded stowed position, as shown in FIGS. 5A and 5B. In addition, a seatback assembly 14 that rotates about a single pivot P may also lack adequate clearance in the forward direction to prevent interference with motor vehicle seating assemblies 10 located forward of the seatback assembly 14 during the process of folding the seatback assembly 14 forward. Efforts to extend the rear cargo area floor 6 forward or moving the motor vehicle seating assembly 10 rearward does not eliminate the gap W. The contact point C on the exposed rearward surface 46 of the seatback assembly 14 and between the forward edge 52 of the rear cargo area floor 6 simply rotates forward, as shown on FIG. 5B.

As shown in FIGS. 8A, 8B, 10A, and 10B, and as an aspect of the present disclosure, the seatback assembly 14 may be mounted to the motor vehicle 2 via a dual motion recliner pivot mechanism 60 that simultaneously pivots the seatback assembly 14 forwardly and translates the seatback assembly 14 rearwardly when rotated to a forward folded stowed position. This dual motion recliner pivot mechanism 60 addresses the problems of closing the gap between the seatback assembly 14 and the rear cargo area floor 6 when the seatback assembly 14 is in the forward folded position, and overcomes the problem with limited clearance between the folding forward seatback assembly 14 and the motor vehicle seating assembly 10 installed in front of the folding forward seatback assembly 14.

This dual motion recliner pivot mechanism 60 alters the seatback assembly 14 motion from a purely rotational motion to a rotational and translational motion. The dual motion recliner pivot mechanism 60 allows the seatback assembly 14 to slide rearward as it pivots forward and down. This is accomplished by mounting the seatback assembly 14 to an arcuate bracket 62. As best seen in FIGS. 6A-6D, 7, and 9A-9B, first end 66 of the arcuate bracket 62 is mounted to an upper portion 68 of the seatback assembly 14 at a first pivot point 70, and a second end 72 of the arcuate bracket 62 is mounted to a lower portion 74 of the seatback assembly 14 at a second support point 76. Thus, the seatback assembly 14 is attached to the curved and arc-shaped arcuate bracket 62 at both ends 66, 72 thereof. Preferably, the curved and arc-shaped arcuate bracket 62 includes an elongated curved slot 64 disposed substantially along a centerline of the arcuate bracket 62, as shown in each of FIGS. 6A-6D, 7, 8A-8B, 9A-9D, 10A-10B, and 11C-11D.

Best shown in FIGS. 6A-6D, a separate forward mount 78 may be operably coupled with the curved slot 64 of the arcuate bracket 62 and may be operably coupled with the floor pan 26, preferably by welding or mechanical fasteners. The forward mount 78 may be provided with a support structure pin 80 mounted to an upper portion 82 of the forward mount 78. The arcuate bracket 62 is operably coupled to the support structure pin 80, which is slidably received within the curved slot 64. The arcuate bracket 62 is thereby restricted in motion by the support structure pin 80 to move along and only within the curved slot 64. The curved slot 64 thus restricts the motion of the arcuate bracket 62 to an arc motion only, as shown in FIGS. 6A-6D and 9A-9D.

A rearward mount 84 may be similarly and preferably operably coupled with the floor pan 26 by welding or mechanical fasteners. A control link 86 may be operably coupled at a first end 88 thereof with the first pivot point 70 and operatively coupled at a second end 90 thereof with the rearward mount 84. The control link 86 is preferably operably coupled with each of the first pivot point 70 and the rearward mount 84 via a pivot pin 92, respectively. The control link 86 thus operably rotates about the pivot pin 92 mounted on rearward mount 84. As a consequence, as the seatback assembly 14 is folded forward, the seatback assembly 14 simultaneously pivots forwardly and translates rearwardly when rotated from the upright design position to the forward folded stowed position.

Figure 8A:
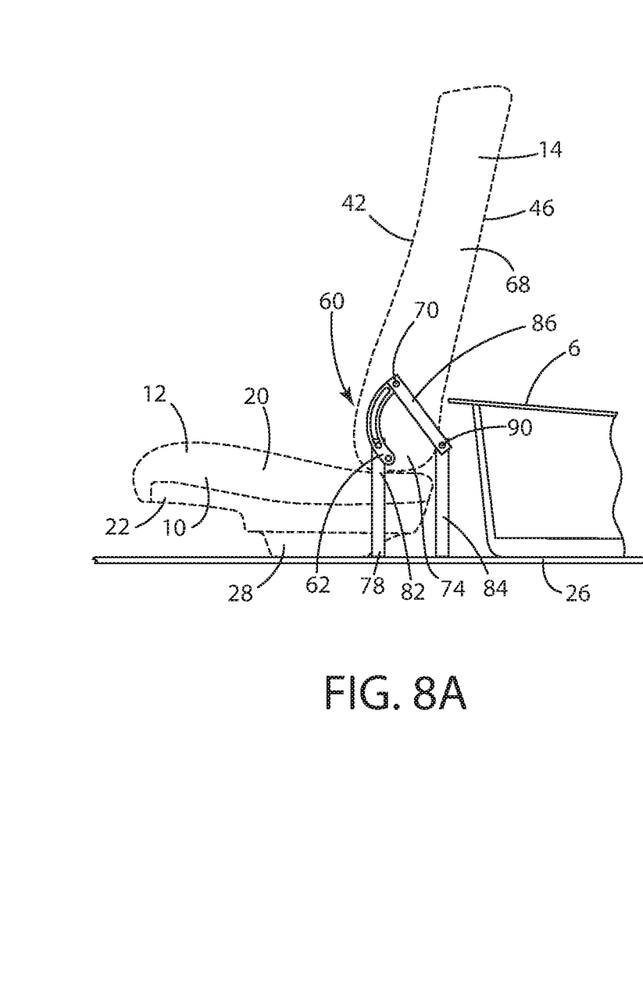
FIG. 8A is a side view of the dual motion recliner pivot mechanism of FIG. 6A of the present disclosure, wherein the seatback assembly is in the upright design position.
Figure 8B:
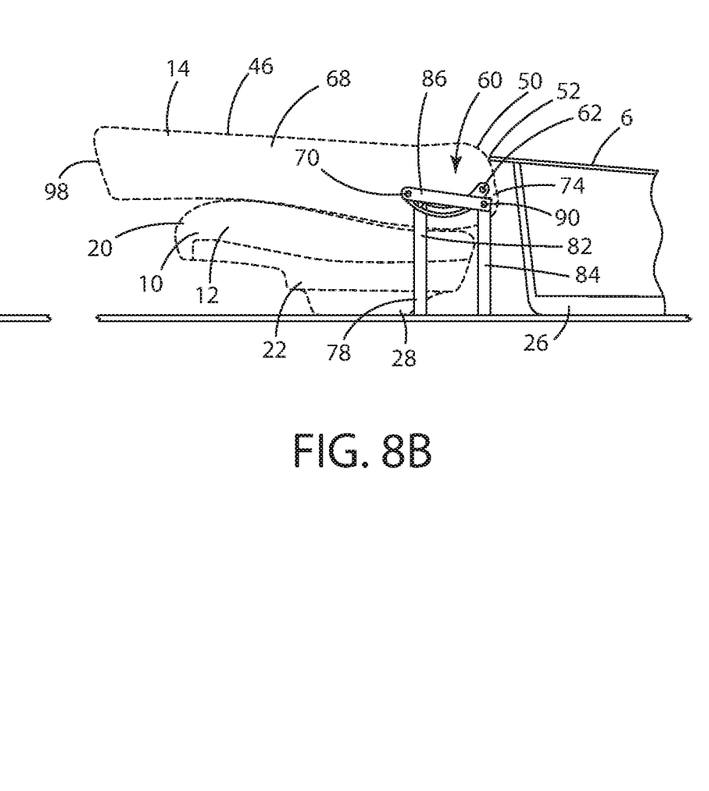
FIG. 8B is a side view of the dual motion recliner pivot mechanism of FIG. 6A of the present disclosure, wherein the seatback assembly is in the forward folded stowed position.
Figure 9A:
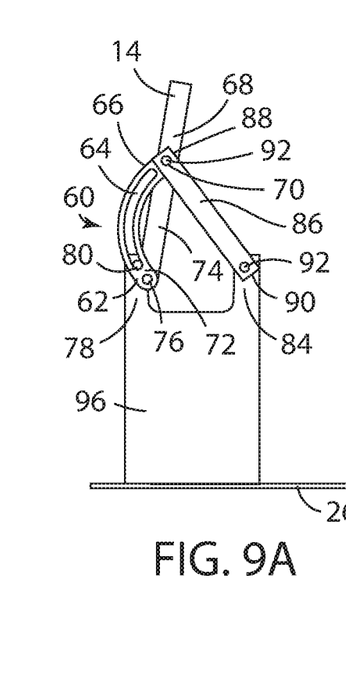
FIG. 9A is a schematic side view of a second embodiment of the dual motion recliner pivot mechanism of the present disclosure, wherein the seatback assembly is in the upright design position.
Figure 9B:
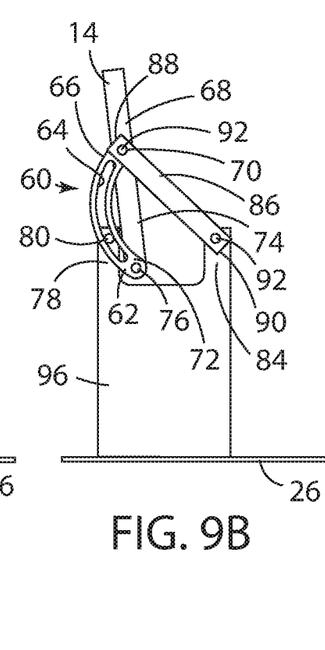
FIG. 9B is a schematic side view of the dual motion recliner pivot mechanism of FIG. 9A of the present disclosure, wherein the seatback assembly is being rotated from the upright design position to the forward folded stowed position.
Figure 9C:
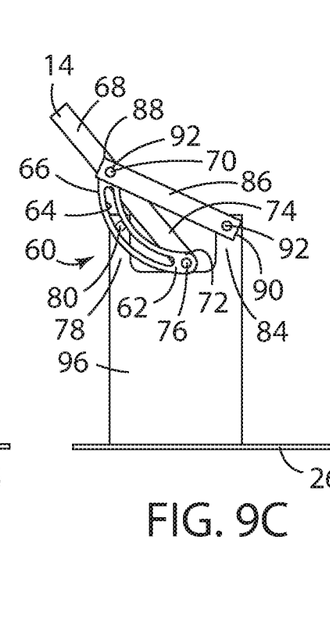
FIG. 9C is a schematic side view of the dual motion recliner pivot mechanism of FIG. 9A of the present disclosure, wherein the seatback assembly is being further rotated from the upright design position to the forward folded stowed position.
Figure 9D:
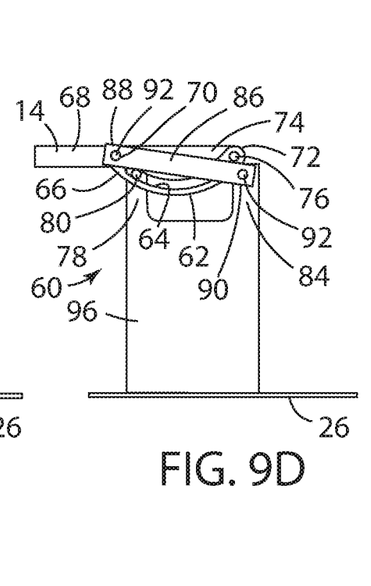
FIG. 9D is a schematic side view of the dual motion recliner pivot mechanism of FIG. 9A of the present disclosure, wherein the seatback assembly is fully rotated to the forward folded stowed position.
Figure 10A:
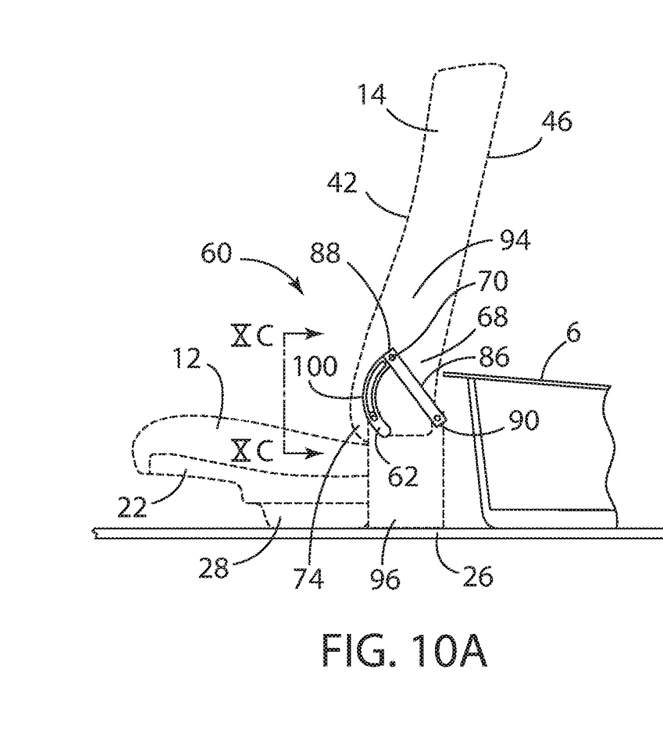
FIG. 10A is a side view of the dual motion recliner pivot mechanism of FIG. 9A of the present disclosure, wherein the seatback assembly is in the upright design position.
Figure 10B:
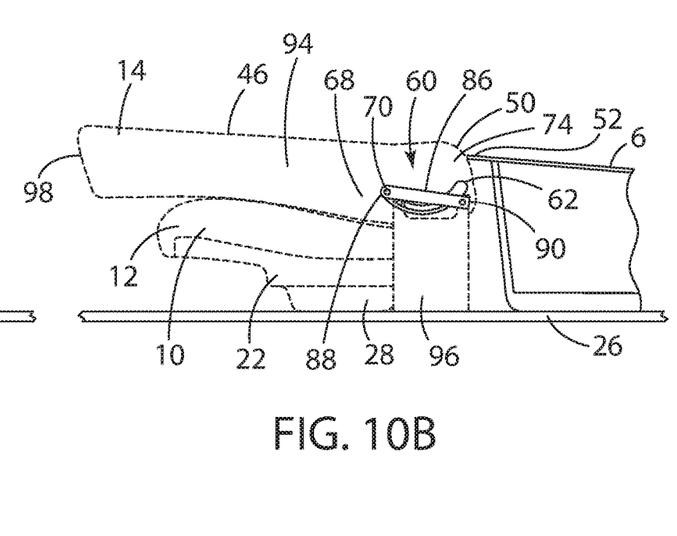
FIG. 10B is a side view of the dual motion recliner pivot mechanism of FIG. 9A of the present disclosure, wherein the seatback assembly is in the forward folded stowed position.
Figure 11A:
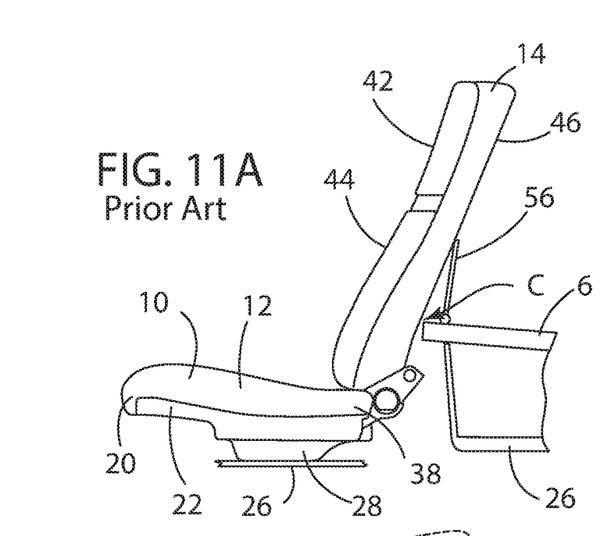
FIG. 11A is a side view of one of the motor vehicle seating assemblies of FIG. 1, wherein the seatback assembly is in the upright design position.
Figure 11B:
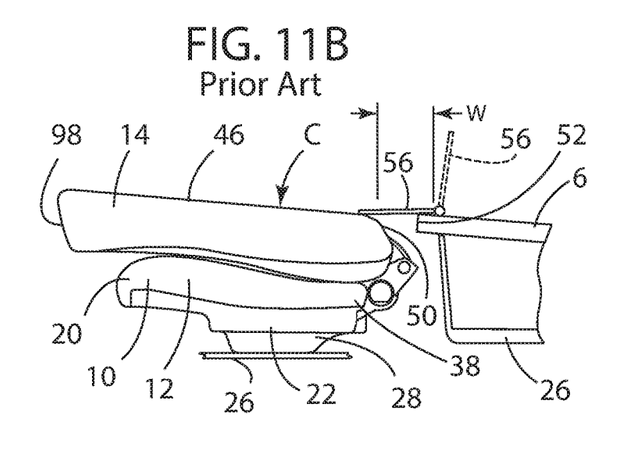
FIG. 11B is a side view of one of the motor vehicle seating assemblies of FIG. 1, wherein the seatback assembly is in the forward folded stowed position.
Figure 11C:
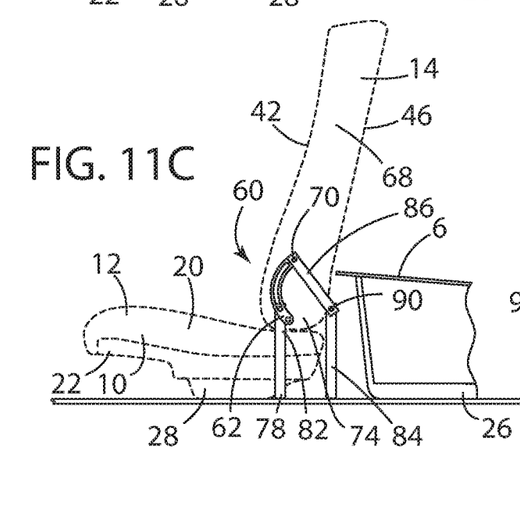
FIG. 11C is a side view of the dual motion recliner pivot mechanism of FIG. 6A of the present disclosure, wherein the seatback assembly is in the upright design position.
Figure 11D:
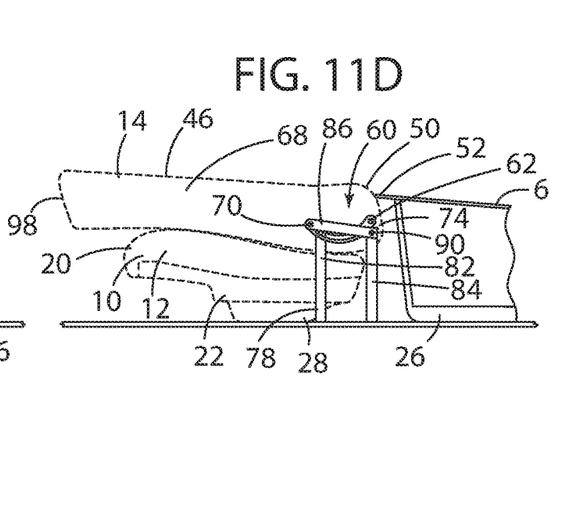
FIG. 11D is a side view of the dual motion recliner pivot mechanism of FIG. 6A of the present disclosure, wherein the seatback assembly is in the forward folded stowed position.

In conjunction with such simultaneous forward rotation and rearward translation, the rearward edge 50 of the seatback assembly 14 moves rearwardly when the seatback assembly 14 is rotated from the upright design position to the forward folded stowed position. Preferably, the rearward edge 50 of the seatback assembly 14 is ultimately disposed in juxtaposed relation with the forward edge 52 of the rear cargo area floor 6 disposed rearward of the motor vehicle seating assembly 10 when the seatback assembly 14 is in the forward folded stowed position. As best seen in FIGS. 8B, 10B, and 11D, the rearward edge 50 of the seatback assembly 14 is disposed in juxtaposed relation with the forward edge 52 of the rear cargo area floor 6 when the seatback assembly 14 is in the forward folded stowed position, and the exposed rearward surface 46 of the seatback assembly 14 and the rear cargo area floor 6 thus form a substantially continuous surface when the seatback assembly 14 is in the forward folded stowed position.

As shown in the embodiment depicted in FIGS. 6A-6D and 8A-8B, the forward mount 78 and the rearward mount 84 may be separately mounted to a floor pan 26 of a motor vehicle. Alternatively, as shown in the embodiment depicted in FIGS. 9A-9D and 10A-10B, the forward mount 78 and the rearward mount 84 may be combined as an integrated bracket 96. The integrated bracket 96 may be fixedly mounted to the floor pan 26 of the motor vehicle 2, with each of the support structure pin 80 and the control link 86 mounted on the integrated bracket 96.

Preferably, the arcuate bracket 62 and control link 86 are fabricated from metal, such as steel. Similarly, any of the forward mount 78, the rearward mount 84, and the integrated bracket 96, either alone or in combination, may also be fabricated from metal, such as steel. However, other materials for the arcuate bracket 62, control link 86, forward mount 78, the rearward mount 84, and the integrated bracket 96, such as carbon-reinforced resins, may be utilized.

Figure 10C:
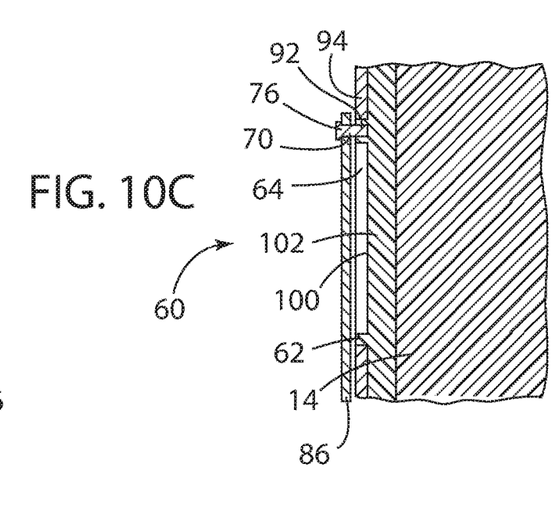
FIG. 10C is a cross-sectional view taken along the line 10C-10C of the seatback assembly in FIG. 10A, wherein the arcuate bracket is integrated into the seatback assembly.

As also shown in the embodiment depicted in FIGS. 9A-9D and 10A-10B, the arcuate bracket 62 may be fixedly mounted and disposed within a recess 100 disposed on a side 94 of the seatback assembly 14, as perhaps best shown in FIG. 10C. In this configuration, the bracket 62 is essentially integrated into the seatback assembly 14 and may comprise a separate component or a portion of the frame 102 for the seatback assembly 14. In either case, the bracket 62 provides the exposed curved slot 64 within which the support structure pin 80 may be received to displace the seatback assembly 14 as described above as the seatback assembly 14 is moved between the upright design position and the forward folded stowed position.

Figure 7:
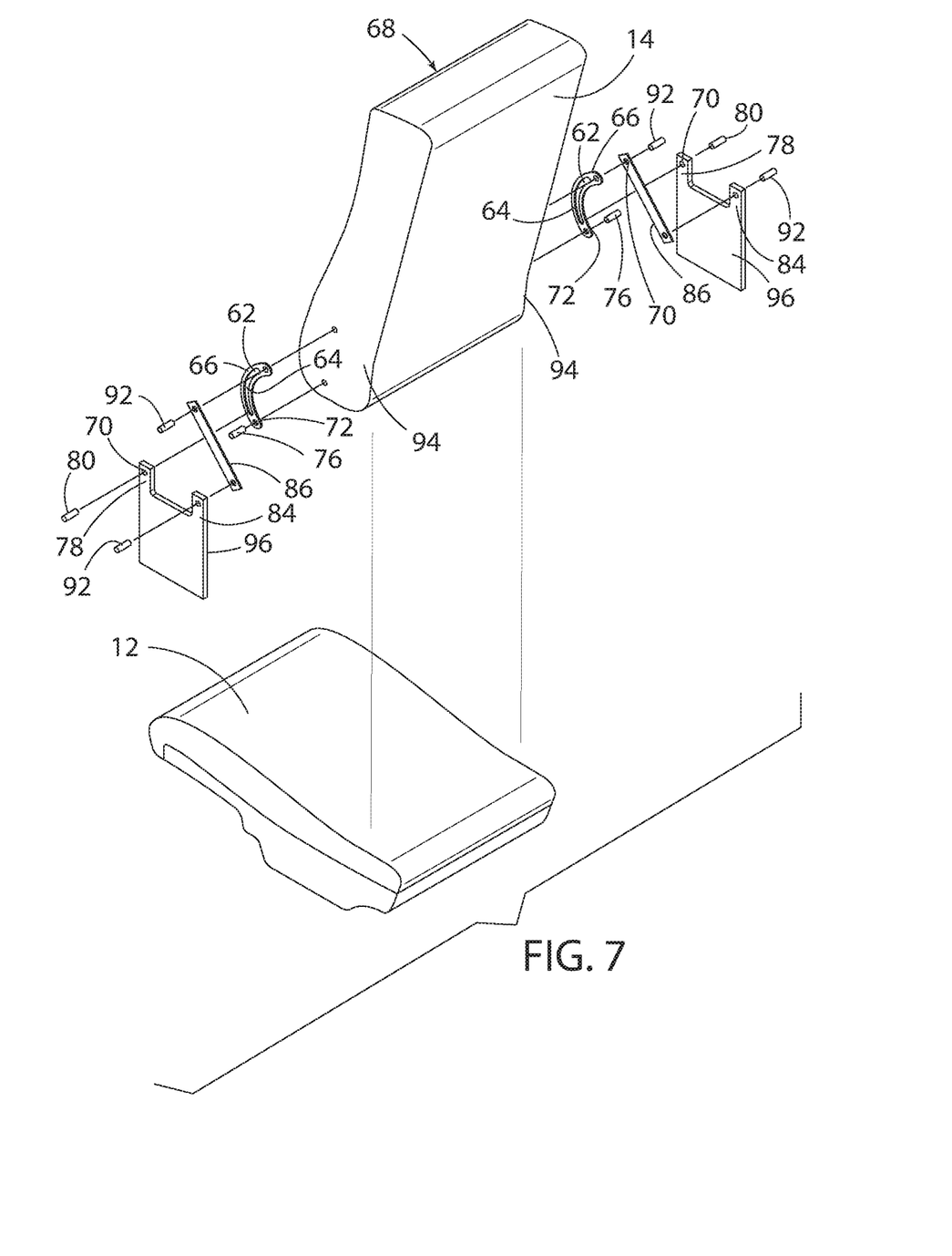
FIG. 7 is an rear perspective exploded view of the dual motion recliner pivot mechanism of FIG. 6A of the present disclosure, wherein the seatback assembly is in the upright design position.

In addition, as depicted in FIG. 7, it should be understood that each seatback assembly 14 may be provided with a pair of arcuate brackets 62 mounted at opposite ends 66, 72 to a seatback assembly 14 at a first pivot point 70 and second support point 76, respectively, a pair of forward mounts 78 operably coupled within a curved slot 64 formed in the arcuate brackets 62, a pair of rearward mounts 84, and a pair of control links 86 operably coupled with each of the first pivot points 70 and the rearward mounts 84. Thus, one each of the pair of arcuate brackets 62, forward mounts 78, rearward mounts 84, and control links 86 may be disposed on each lateral side 94 of the motor vehicle seating assembly 10 to provide coordinated and controlled motion of the seatback assembly 14 between its upright design position and its forward folded stowed position.

Further, is contemplated that the upper portion 68 of the seatback assembly 14, to which the head restraint assembly 40 is mounted, acts as a forward edge 98 when the seatback assembly 14 is folded forward, as perhaps best shown in FIGS. 8B, 10B, and 11D. In the case where a row of the motor vehicle seating assemblies 10 is installed forward of the seatback assembly 14 as it is rotated forward, the present disclosure also provides the benefit of displacing the forward edge 98 of the seatback assembly 14 rearwardly, so as to create greater clearance between the seatback assembly 14 in folded stowed position and the forwardly mounted motor vehicle seating assemblies 10. That is, each of the forward edge 98 and the rearward edge 50 of the seatback assembly 14 moves rearwardly when the seatback assembly 14 is rotated from the upright design position to the forward folded stowed position.

The motor vehicle seating assembly 10 according to the present disclosure includes the lower seating assembly 12, seatback assembly 14, and dual motion recliner pivot mechanism 60. The dual motion recliner pivot mechanism 60 preferably comprises an arcuate bracket 62 mounted at a first end 66 to an upper portion 68 of the seatback assembly 14 at a first pivot point 70 and at a second end 72 to a lower portion 74 of the seatback assembly 14 at a second support point 76. A forward mount 78 is operably coupled within a curved slot 64 before formed in the arcuate bracket 62, and a control link 86 is operably coupled with each of the first pivot point 70 and a rearward mount 84. When the seatback assembly 14 pivots forwardly, it is simultaneously translated rearwardly when rotated to a forward folded stowed position.

It should be appreciated that the motor vehicle seating assembly 10 according to the present disclosure may be arranged as one of a pair of motor vehicle seating assemblies 10 disposed in side-by-side relation within the motor vehicle 2. Particularly where the pair of motor vehicle seating assemblies 10 comprises a second row or further rearward motor vehicle seating assembly 10 with a rear cargo area floor 6 disposed rearward of the pair of motor vehicle seating assemblies 10. In such an arrangement, the rearward edge 50 of the seatback assembly 14 of each of the pair of motor vehicle seating assemblies 10 is disposed in juxtaposed relation with a forward edge 52 of the rear cargo area floor 6 when either of the seatback assemblies 14 is in the forward folded stowed position. Further, the rear cargo area floor 6 forms a substantially continuous surface with each of the exposed rearward surfaces 46 of the seatback assemblies 14 when each of the seatback assemblies 14 of the pair of motor vehicle seating assemblies 10 is in the forward folded stowed position.

As a result of the foregoing features, a dual motion recliner pivot mechanism 60 is available to reduce cost, weight, and complexity by eliminating the requirement for additional trim pieces 56, or gap hiders, to bridge the gaps created between the seatback assembly 14 and the rear cargo area floor 6. The elimination of gap hiders further contributes to a higher level of craftsmanship by eliminating gaps W within the motor vehicle environment without the use of obvious trim pieces previously used to avoid height such gaps.

The dual motion recliner pivot mechanism 60 disclosed herein further provides additional clearance between the seatback assembly 14 in the forward folded stowed position and the motor vehicle seating assemblies 10 located in front of the folding forward seatback assembly 14. This feature eliminates the need for a folding head restraint assembly 40, further reducing cost and weight. This feature also allows for increased design and fore-aft travel of the motor vehicle seating assemblies 10 located in front of the folding forward seatback assembly 14.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seating assembly comprising;
   an arcuate bracket mounted to a seatback assembly and a first pivot point disposed proximate a first end of the arcuate bracket;
   a forward mount operably coupled within a curved slot formed in the arcuate bracket;
   a rearward mount; and
   a control link operably coupled with each of the first pivot point and the rearward mount;
   wherein the seatback assembly pivots forwardly and translates rearwardly when rotated to a stowed position.

2. The seating assembly of claim 1, wherein the forward mount further comprises a support structure pin that is slidably disposed and received within the curved slot and through which the forward mount is operably coupled with the curved slot.

3. The seating assembly of claim 1, wherein the seatback assembly is foldable between an upright design position and the stowed position; and
   the arcuate bracket is mounted at opposite ends to the seatback assembly at the first end of the arcuate bracket and a second end of the arcuate bracket, respectively, wherein the first end of the arcuate bracket is mounted to an upper portion of the seatback assembly at the first pivot point and a second end of the arcuate bracket is mounted to a lower portion of the seatback assembly.

4. The seating assembly of claim 3, wherein a rear edge of the seatback assembly moves rearwardly when the seatback assembly is rotated from the upright design position to the stowed position.

5. The seating assembly of claim 4, wherein the rear edge of the seatback assembly is disposed in juxtaposed relation with a forward edge of a rear cargo area floor when the seatback assembly is in the stowed position.

6. The seating assembly of claim 5, wherein an exposed rearward surface of the seatback assembly and the rear cargo area floor form a substantially continuous surface when the seatback assembly is in the stowed position.

7. The seating assembly of claim 1, wherein the arcuate bracket is fixedly mounted and disposed within a recess disposed on a side of the seatback assembly.

8. The seating assembly of claim 1, wherein the forward mount and the rearward mount are separate components separately mounted to a floor pan of a motor vehicle.

9. The seating assembly of claim 1, wherein the forward mount and the rearward mount are combined as an integrated bracket mounted to a floor pan of a motor vehicle.

10. The seating assembly of claim 1, wherein the arcuate bracket comprises one of a pair of arcuate brackets each mounted at opposite ends to the seatback assembly at the first pivot point and a second support point, respectively, the forward mount comprises one of a pair of forward mounts operably coupled within a curved slot formed in each of the arcuate brackets, the rearward mount comprises one of a pair of rearward mounts, and the control link comprises one of a pair of control links operably coupled with each of the first pivot points and the rearward mounts, and wherein one each of the pair of arcuate brackets, the pair of forward mounts, the pair of rearward mounts, and the pair of control links is disposed on each lateral side of the seating assembly.

11. A dual motion recliner pivot mechanism for a forward foldable seatback assembly having an upright design position and a forward folded stowed position mounted to a floor pan of a motor vehicle, the dual motion recliner pivot mechanism comprising;
   an arcuate bracket having a curved slot disposed substantially along a centerline of the arcuate bracket, where a first end of the arcuate bracket is disposed proximate to an upper portion of the forward foldable seatback assembly at a first pivot point and a second end of the arcuate bracket is disposed proximate to a lower portion of the forward foldable seatback assembly;
   a forward mount operably coupled with the curved slot of the arcuate bracket;
   a rearward mount; and
   a control link operably coupled at a first end thereof with the first pivot point and operatively coupled at a second end thereof with the rearward mount;
   wherein the forward foldable seatback assembly simultaneously pivots forwardly and translates rearwardly when rotated from the upright design position to the forward folded stowed position.

12. The dual motion recliner pivot mechanism of claim 11, wherein each of a forward edge and a rear edge of the seatback assembly moves rearwardly when the seatback assembly is rotated from the upright design position to the forward folded stowed position.

13. The dual motion recliner pivot mechanism of claim 12, wherein the seating assembly comprises a second row or further rearward seating assembly and a rear cargo area floor is disposed rearward of the seating assembly.

14. The dual motion recliner pivot mechanism of claim 13, wherein the rear edge of the seatback assembly is disposed in juxtaposed relation with a forward edge of the rear cargo area floor when the seatback assembly is in the forward folded stowed position and an exposed rearward surface of the seatback assembly and the rear cargo area floor form a substantially continuous surface when the seatback assembly is in the forward folded stowed position.

15. The dual motion recliner pivot mechanism of claim 11, wherein the control link is operably coupled with each of the first pivot point and the rearward mount via a pivot pin, respectively.

16. The dual motion recliner pivot mechanism of claim 11, wherein the forward mount comprises a support structure pin that is slidably received and disposed within the curved slot, whereby the support structure pin operably couples the forward mount with the curved slot of the arcuate bracket.

17. The dual motion recliner pivot mechanism of claim 16, further comprising an integrated bracket mounted to a floor pan of a motor vehicle, and wherein each of the support structure pin and the control link is mounted on the integrated bracket.

18. A seating assembly comprising a seatback assembly, a lower seat assembly, and a dual motion recliner pivot mechanism, the dual motion recliner pivot mechanism comprising;
   an arcuate bracket having a first end mounted proximate to an upper portion of the seatback assembly proximate a first pivot point and a second end mounted proximate to a lower portion of the seatback assembly;
   a forward mount operably coupled within a curved slot formed in the arcuate bracket;
   a rearward mount; and
   a control link operably coupled with each of the first pivot point and the rearward mount;
   wherein the seatback assembly pivots forwardly and is translated rearwardly when rotated to a forward folded stowed position.

19. The seating assembly of claim 18, wherein the dual motion recliner pivot mechanism comprises one of a pair of dual motion recliner pivot mechanisms, one each of the pair of dual motion recliner pivot mechanisms being disposed on each lateral side of the seating assembly.

20. The seating assembly of claim 19, wherein the seating assembly is arranged as one of a pair of seating assemblies disposed in lateral side-by-side relation within a motor vehicle, the pair of seating assemblies being disposed to define a second row or further rearward seating assembly with a rear cargo area floor disposed rearward of the pair of seating assemblies, and wherein a rear edge of the seatback assembly of each of the pair of seating assemblies is disposed in juxtaposed relation with a forward edge of the rear cargo area floor when either of the seatback assemblies is in the forward folded stowed position and an exposed rearward surface of the seatback assembly and the rear cargo area floor form a substantially continuous surface when each of the seatback assemblies of the pair of seating assemblies is in the forward folded stowed position.

\* \* \* \* \*